United States Patent [19]
Volkmann et al.

[11] Patent Number: 6,166,126
[45] Date of Patent: Dec. 26, 2000

[54] BINDER SOLUTIONS FOR PRINTING INKS CONTAINING AROMATIC POLYMERS WITH HIGH SOFTENING POINTS

[76] Inventors: Norbert Volkmann, Am Vorstgraben 54, D-47647 Kerben; Ulrich Knips, Werver Mark 174, D-59174 Kamen; Robert Zellerhoff, Mollenkampweg 7, D-46499 Hamminkeln, all of Germany

[21] Appl. No.: 08/817,378

[22] PCT Filed: Sep. 29, 1995

[86] PCT No.: PCT/EP95/03853

§ 371 Date: Aug. 22, 1997

§ 102(e) Date: Aug. 22, 1997

[87] PCT Pub. No.: WO96/10613

PCT Pub. Date: Apr. 11, 1996

[30] Foreign Application Priority Data

Oct. 4, 1994 [DE] Germany ............................... 44 35 408

[51] Int. Cl.[7] .............................. C09D 11/02; C08K 5/01; C08K 5/03

[52] U.S. Cl. ........................... 524/486; 524/848; 106/311; 106/31.13

[58] Field of Search ...................................... 524/486, 848; 106/311, 31.13

[56] References Cited

U.S. PATENT DOCUMENTS 4,252,699  2/1981  Tsuchiya et al. .................. 260/19 UA

*Primary Examiner*—David W. Wu
*Assistant Examiner*—K C Egwim
*Attorney, Agent, or Firm*—Nutter, McClennen & Fish, LLP

[57] ABSTRACT

Binding-agent solutions for printing inks include of resin and solvent that contain from 10 to 70% by weight of one or more aromatic polymers with a softening point above 120° C. and from 90 to 30% by weight of a solvent mixture, consisting of a mineral-oil fraction with a boiling range of from 200 to 550° C. and of an alkylaromatic mixture of mono-, di-, tri and tetraisopropyl naphthalenes, whose aromatic carbon content lies in the range of from 20 to 60% of the total carbon.

6 Claims, No Drawings

BINDER SOLUTIONS FOR PRINTING INKS CONTAINING AROMATIC POLYMERS WITH HIGH SOFTENING POINTS

FIELD AND BACKGROUND OF THE INVENTION

The invention concerns solutions of resins and solvents, which are suitable as binding-agent solutions for printing inks, particularly for rotation printing processes with high printing speeds. Such solutions are known from DE A 4,010,319, in which a mineral-oil fraction with a boiling range of 200–450° C. serves as a solvent and, as binding agents, aromatic polymers with a softening point of 30–120° C.

These solutions are in any case unsuitable for high printing speeds. Corresponding printing inks bleed through very easily or cause a counterpressure during subsequent stacking.

To avoid this, it is necessary to use polymers or resins with a softening point above 120° C.

The aromatic polymers, which actually impart a good characteristics profile to the printing inks, are however no longer soluble in mineral oils, when they are so highly polymerized that their softening point lies above 120° C.

The additional use of crosslinking aids, which could solve this problem, is undesirable, because the crosslinking aids result in water pollution after deinking, when the paper is recycled.

The use of aromatic oils as solvents requires disclosure, due to the content of potentially carcinogenic polycylic aromatics, and is therefore not feasible. Moreover, aromatics, such as arylaromatic compounds, exhibit overly good compatibility with the aromatic polymers. The polymer penetrates with this polymer into the paper, carrying corresponding pigment and printing ink along with it, and leads to migration and bleeding effects.

SUMMARY OF THE INVENTION

It is therefore the goal of the invention to produce binding-agent solutions for printing inks, which permit high printing speeds, with exhibiting bleeding, counterpressure and smearing effects, which require no crosslinking aids and contain no compounds requiring disclosure above the corresponding limits.

The solution to this problem is the result of binding-agent solutions according to the invention.

DETAILED DESCRIPTION OF THE INVENTION

It was found that aromatic polymers (resins) with a softening point above 120° C. dissolve in a mixture of mineral oils and alkylaromatics. Such solutions, which contain 10–70% by weight of one or more aromatic polymers with a softening point above 120° C. in a solvent mixture consisting of a mineral-oil fraction with a boiling range of 200–550° C. and consist of alkylaromatics, in which case the aromatic-carbon content of the mixture lies in the range of 20–60% by weight of the total carbon, are excellently suitable as binding-agent solutions for printing inks, especially for those used at extremely high printing speeds. On the one hand, the solutions are stable, but separation takes place on the other hand very quickly on contact with an absorbent material, for example, paper. While the solvent mixture penetrates very quickly into the bottom and is distributed very quickly in the absorbent substrate, the resin as well as the pigment bound by the resin remain on the surface of the absorbent material. In other words, during printing, a clear image arises immediately, which does not bleed through with high printing speeds, without the appearance of migration effects, counterpressure or smearing effects.

The invented binding-agent solutions contain accordingly 10–70% by weight, especially 15–45% by weight of one or more aromatic polymers. Usable are highly polymerized polymers of unsaturated compounds with an aromatic or quasi aromatic base, such as indene, dicyclopentadiene, vinyltoluene, methylindene, aromatic hydrocarbon, alpha-methylstyrene and styrene resins or resin residues, for example, residues from visbreakers or ethylene crackers, from the synthesis of styrene, phenol, ethyl benzene or dimethyl terephthalate. They have a softening point above 120° C., i.e. preferably in the 121–180° C. range, especially in the 125–165° C. range, and are essentially free of polycyclic, aromatic compounds.

Employed as a mineral oil, per the invention, is a distillation cut in the boiling range from approximately 200° C. to 550° C., preferably from about to 250 to 450° C., which ordinarily exhibits an aromatic content of up to 30%, a density at 20° C. of approximately 800–1,200 kg/m$^3$ and a flash point in excess of 100° C. The aromatic content consists nearly exclusively of nonpolycyclic aromatics, for the most part of alkylated aromatic hydrocarbons or aromatic heterocyclic substances.

The term aromatic content is found of course in the specifications of such mineral oils. It is however not usable per the meaning of the present invention, even misleading. Alkylbenzenes, for example, with long alkyl chains, are included as aromatics according to this view, even though the aromatic fraction is relatively small.

Crucial to the solvent mixture employed according to the invention is therefore, not the aromatic content in the above-indicated sense, but only the aromatic hydrocarbon content. This aromatic hydrocarbon content is usually 3–18% for the mineral oils. As a rule, it lies at 7%. By mixing the mineral oil fraction with alkylaromatic substances, the aromatic hydrocarbon content of the solvent mixture is adjusted to a value in the 20–60% range, preferably 25–45%, of the total hydrocarbons, that is to say, both the aliphatic and cycloaliphatic portions of the mineral oil as well as the alkyl groups of the aromatic fraction and the number and length of the alkyl groups of the alkylaromatic substances determine the mixing ratio of the two solvent components.

The alkylaromatic substances usable as solvent components are preferably alkylaromatic mixtures and can be mono-, bi- or trinuclear alkylaromatics, alkylated with methyl, ethyl, propyl, butyl and/or pentyl groups of all isomerization forms, in which case the aromatic substances can occur one, two and/or more times in the compounds, as well as diphenylmethane, -ethane, -propane, etc., up to diphenyldodecane, where the phenyl rings can likewise be occupied by the above-named alkyl groups, or arylaromatic substances having the chemical constitution of bi-, ter- and/or quarterphenylen.

The preferred alkylaromatic substances are alkylnaphthalenes, whose alkyl chains have from 1 to 3 C-atoms, particularly mixtures of mono-, di-, tri- and tetraisopropylnaphthalenes in the desired ratio of their respective isomers.

EXAMPLE

The applied polymer is a hydrocarbon resin, produced by polymerization (according to the process per DE-AS 3,044, 592) of the polymerizable fractions (vinyltoluene, indene, methylindene, coumarone, styrene, alpha-methylstyrene) of an aromatic hydrocarbon fraction (boiling range, 140–220° C.) from coal tar. The resin has a softening point of 130° C. The mineral oil employed is a hydrated, naphthenic mineral oil with a boiling range of 360–490° C. It has an aromatic hydrocarbon content of 7%.

The alkylaromatics used are a reaction mixture obtained from the isopropylations of naphthalene. It contains essentially diisonaphthalene in addition to small quantities of mono-, tri- and tetraisopropyl naphthalenes. The aromatic hydrocarbon content os 62%.

200 g of Polymer are added to 350 g of alkylaromatic substances at 140° C., with stirring, the stirring being continued until a homogeneous mixture results. This solution is cooled to 80° C. and mixed with 350 g of mineral oil. The resulting homogeneous binding-agent solution has a viscosity of 12,900 mPas at 20° C.

In three-roller mill, 98 parts by weight of the binding-agent solution, 11.5 parts by weight of soot and 0.5 parts by weight of naphthalene sulfonate are combined into a paste. The resulting mass is employed as a printing ink in the roller-offset process.

A clean printed image is obtained even with a high printing speed, and neither smearing or migration effects are observed.

What is claimed is:

1. Binding-agent solutions for printing inks consisting of from 10 to 70% by weight of a resin containing one or more aromatic polymers with a softening point above 120° C. and from 90 to 30% by weight of a solvent mixture, consisting of a mineral-oil fraction with a boiling range of from 200 to 550° C. and of an alkylaromatic mixture of mono-, di-, tri and tetraisopropyl naphthalenes, wherein the aromatic carbon content of the solvent mixture lies in the range of from 20 to 60% of the total carbon.

2. Binding-agent solutions according to claim 1, wherein the aromatic polymers have a softening point in the range of from 121 to 180° C.

3. Binding-agent solutions according to claim 1, wherein the aromatic polymers have a softening point in the range of from 125 to 165° C.

4. Binding-agent solutions according to claim 1, wherein the solvent mixture has a content of aromatic carbon from 25 to 45%.

5. Binding-agent solutions according to claim 2, wherein the solvent mixture has a content of aromatic carbon from 25 to 45%.

6. Binding-agent solutions according to claim 3, wherein the solvent mixture has a content of aromatic carbon from 25 to 45%.

* * * * *